UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

1-METHYL-2-AMINO-4-ISOPROPYL-5-NITROBENZENE.

1,314,923.  Specification of Letters Patent.  Patented Sept. 2, 1919.

No Drawing.    Application filed September 22, 1917.  Serial No. 192,783.

*To all whom it may concern:*

Be it known that I, CHESTER E. ANDREWS, a citizen of the United States, residing at Pittsburgh, in the county of Allegheny and State of Pennsylvania, have invented certain new and useful Improvements in 1 - Methyl - 2 - Amino - 4 - Isopropyl - 5 - Nitrobenzene, of which the following is a specification.

The present invention relates to the production of amino compounds of cymene and intermediate products.

The preparation of 1-methyl-2-amino-4-isopropyl benzene, or amino cymene has already been described in my copending application 191,245 filed September 13, 1917, the process consisting briefly in nitrating cymene by dissolving the cymene in sulfuric acid and adding thereto a nitrating mixture comprising sulfuric and nitric acids, while agitating the mixture, and subsequently reducing the nitro body thereby produced, for example by iron and hydrochloric acid. This material, amino cymene, which may be in either the crude or purified state, forms the starting material of the present process.

To introduce a nitro group into a position para to the amino group, it is first necessary to block off the amino group to prevent action of the nitrating material thereupon. This operation may conveniently be effected by adding about one and one-half to two molecular equivalents of glacial acetic acid, and heating the mixture to boiling for about 15 to 20 hours in a vessel provided with a reflux condenser. During this operation the NH$_2$ group of the amino compound is transformed into the NHCOCH$_3$ group, which is resistant to the nitrating mixture. The reaction mixture is then cooled whereupon the same solidifies, and the mono acetyl amino cymene is then nitrated. This operation is most conveniently carried out as follows: 19 parts of the acetyl amino cymene are dissolved in 84 parts of sulfuric acid of about 98% strength and the mixture cooled to 0° C. or thereabout. A nitrating solution containing about 13 parts of sulfuric acid of 98% strength and 10 parts of nitric acid of 70% strength is then added slowly to the sulfuric acid solution of the acetyl-amino body while the mixture is vigorously stirred and while the temperature is maintained at about 0° C. It is essential that the temperature be kept down during this operation.

By the time all of the nitrating acid has been added, the nitration is substantially complete and the product consists essentially of 1-methyl-2-acetyl-amino-4-isopropyl-5-nitro benzene. The reaction mixture is poured into a large quantity of ice water, that is to say water containing cracked ice which is constantly stirred, and a yellowish precipitate is produced consisting of para nitro acetyl-amino cymene.

This material may be then treated directly for the reduction of the nitro group to an amino group, or may be treated for the removal of the acetyl group. The former of these two methods is for most purposes preferable, and may be conducted by adding hydrochloric acid and iron and heating the mixture, producing 1-methyl-2-acetyl amino-4-isopropyl-5-amino benzene, which material may be separated from the reaction mixture by crystallization or by extraction with a suitable solvent such as fusel oil or ether.

The acetyl group may then be removed by boiling the entire quantity of the compound produced as above described, with 50 parts of concentrated hydrochloric acid until all is dissolved, and upon cooling the hydrochlorid of 1-methyl-2-amino-4-isopropyl-5-amino benzene separates out in the form of crystals. This mode of operation is in many ways preferable, since there is produced as an intermediate product 1-methyl-2-acetyl amino-4-isopropyl-5-amino benzene, which material has the advantage of containing two amino groups, only one of which is diazotizable. This intermediate product may be diazotized by treating with HNO$_2$ and coupled with a suitable compound such as a hydroxyl aromatic derivative in an alkali solution or an amino aromatic derivative in an acid solution, after which the acetyl group can be removed and the 2-amino group can be then caused to react with a suitable compound, for example it can be coupled with an aromatic hydroxyl derivative or an aromatic amino derivative, (in the manner above stated) different from the one employed in the previous operation. This mode of working is preferable to reacting with tetrazotized diamino cymene upon aromatic hydroxyl derivatives or aromatic amino derivatives, since in the latter case the tendency is for both diazo groups to couple with the same compound.

The second mode of treating 1-methyl-2-acetyl amino-4-isopropyl-5-nitro benzene is by removing the acetyl group, which may be effected by boiling the entire quantity produced as above described, with 50 parts of concentrated hydrochloric acid, until the same completely dissolves, when upon cooling crystals of hydrochlorid of 1-methyl-2-amino-4-isopropyl-5-nitro benzene are produced. These crystals may be purified by recrystallization from hydrochloric acid solution, and the product then is suitable for coupling with an aromatic hydroxy compound, or an aromatic amino compound for the production of dyestuffs by the method above referred to.

The compounds 1-methyl-2-amino-4-isopropyl-5-amino benzene and 1-methyl-2-amino-4-isopropyl-5-nitro benzene are both suitable for the production of dyestuffs by the method above referred to.

The reactions taking place in the process of the present invention may be illustrated conveniently as follows:

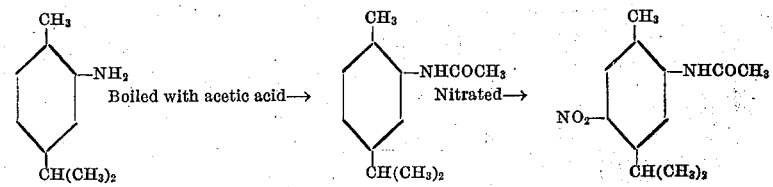

First method:

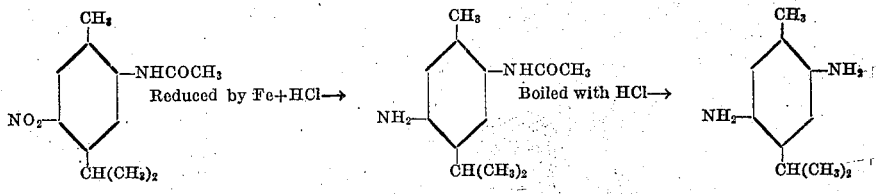

Second method:

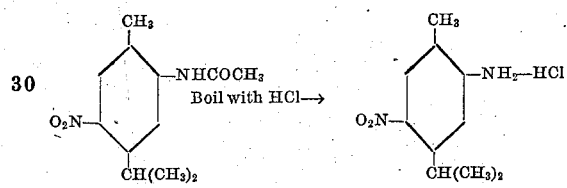

What I claim is:
A body having the formula:—

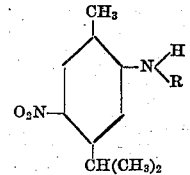

in which R is hydrogen or a radical stable in the presence of $HNO_3$ at 0° C.

In testimony whereof I affix my signature.
CHESTER E. ANDREWS.